Dec. 7, 1954 E. BLUM ET AL 2,696,190
POINTER ATTACHING MEANS
Filed Dec. 4, 1950
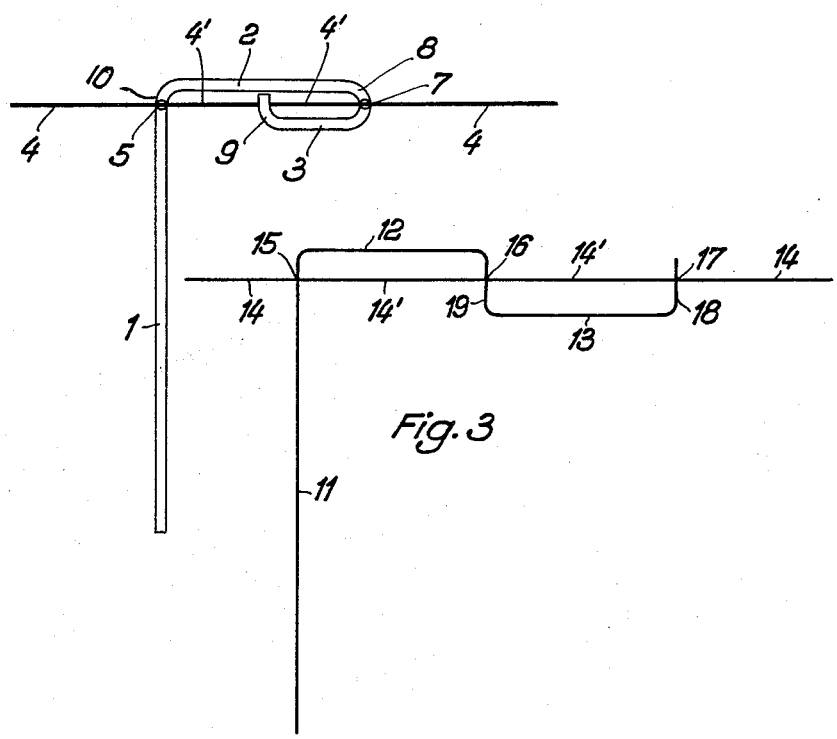
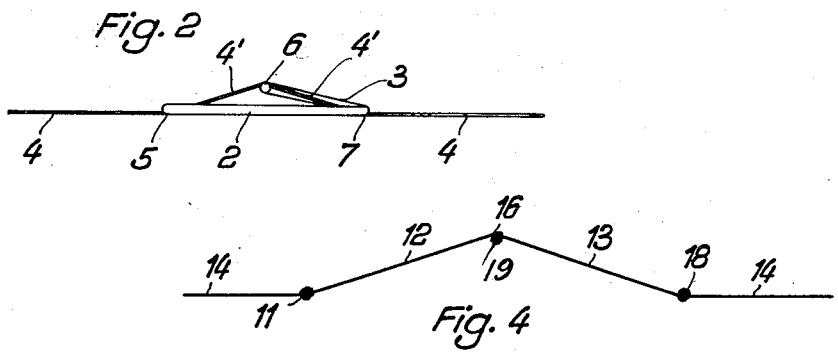

United States Patent Office 2,696,190
Patented Dec. 7, 1954

2,696,190

POINTER ATTACHING MEANS

Eduard Blum and Josef Schuhwerk, Villingen (Schwarzwald), Germany, assignors to Saba, Schwarzwalder Apparate-Bau-Anstalt, August Schwer Sohne, G. m. b. H., Villingen (Schwarzwald), Germany Application December 4, 1950, Serial No. 198,941

Claims priority, application Germany December 6, 1949

3 Claims. (Cl. 116—124.1)

The invention relates to attaching means for pointers as are used for station dials of radio receivers and carried by a driving cord.

It is one object of the invention to provide a simple, trouble-free working pointer attaching means produced by bending a pointer consisting of a single wire piece.

It is a further object of the invention to provide a pointer attaching means which avoids fastening loops of the driving cord and enables it to be in contact with at least three points of the wire.

With these and other objects in view which will become apparent as the specification proceeds, the invention mainly consists in a pointer consisting of a bent wire having a pointer portion and an attaching means including at least three spaced driving cord portions, namely at least two outer driving cord portions, and at least one intermediate driving cord portion, said outer driving cord portions having surface portions located in one plane, and said intermediate driving cord portion having a surface portion located in a parallel plane, said three driving cord portions being located between said parallel planes, and a driving cord extending mainly in said one plane engaging said surface portions of said outer driving cord portions, and having a deflected driving cord portion including a projecting center portion engaging said surface portion of said intermediate driving cord portion so that said attaching means is held on said driving cord when said driving cord is tensioned.

The invention will be best understood by reference to the accompanying drawings, in which:

Figure 1 is an elevation of an embodiment of the invention showing the pointer carried by the driving cord;

Figure 2 is a plan view of the same;

Figure 3 shows in elevation a modified embodiment of the invention to be used in connection with particularly long pointers; and Figure 4 is a plan view thereof.

Referring now more specifically to the drawings, there is shown a dial pointer for radio apparatus having at one end an attaching portion or means which is twice angularly bent so as to form two arm portions 2 and 3, respectively. Moreover, said arm portion 3 is bent out of the plane constituted by the pointer 1 and the adjacent arm portion 2 so as to provide a three point guide for a driving cord 4 carrying the pointer. The rounded bent portion 8 intermediate the arm portions 2 and 3, a bent end portion 9 adjacent to the arm portion 3 and the bent portion 10 merging into the pointer portion 1 are cord holding portions. As shown in Figure 2, the two outer cord holding portions 8 and 10 have outer surface portions located in a plane, and the intermediate cord holding portion 9 has an outer surface portion located in a parallel plane. The driving cord engages these three surface portions, and has a deflected cord portion 4'. The above mentioned surface portions are provided with notches 5, 6, 7 located in one plane and forming the corners of a triangle, which may preferably have isosceles or equilateral shape. The cord may be secured by lacquering, soldering, riveting and the like to the notched surfaces 5, 6, 7. The cord parts 4 adjacent to the deflected cord portions 4' form a straight line and the deflecting angles are small so as to prevent excessive wear of the cord. The pointer, according to the invention, may be provided with more than three supporting points and may consist of any suitable material such as metal or plastics or a combination thereof.

In the modified embodiment of the dial pointer attaching means schematically shown in Figures 3 and 4 the wire pointer 11 again is repeatedly right-angularly bent at one of its ends in order thereby to establish the plane passing in the direction of the cord 14 and vertically through same for the location of the cord attaching points 15, 16, and 17. The protruding arm portions 12 and 13 of the pointer wire between these cord attaching points extend from both sides of a right-angularly bent intermediate cord holding portion 19. Particularly for pointers of great length, such as 11, this simpler way of forming the wire is preferable. It also saves material as compared with the modification shown in Figures 1 and 2, as for obtaining of long lever arms 12 and 13 with respect to the length of the pointer 11, the attaching points 15, 16, and 17 engaging the cord 14 need only to be located as wide apart from each other as conveniently possible. In Figure 3, the numeral 14' indicates those parts of the driving cord 14, which are deflected over the bearing points 15, 16, and 17, while 18 denotes the outer cord holding portion of the pointer wire which is bent up at right angles.

The manner of using and applying the illustrative embodiment of the invention set forth above will be clear from the foregoing description. It will be apparent that the pointer is held on the driving cord when the cord is tensioned, without requiring any further support or guidance. It is, of course, to be understood that the invention is not limited to the specific embodiment thereof here shown and described for purposes of illustration only.

What we claim is:

1. In a device of the type described, in combination, a pointer consisting of a bent wire having a pointer portion and an attaching means including at least three spaced cord holding portions, namely at least two outer cord holding portions, and at least one intermediate cord holding portion, said outer cord holding portions having surface portions located in one plane, and said intermediate cord holding portion having a surface portion located in a parallel plane, said three cord holding portions being located between said parallel planes; and a driving cord extending mainly in said one plane engaging said surface portions of said outer cord holding portions, and having a deflected cord portion including a projecting center portion engaging said surface portion of said intermediate cord holding portion so that said attaching means is held on said driving cord when said driving cord is tensioned.

2. In a device of the type described, in combination, a pointer consisting of a bent wire having a pointer portion and an attaching means including at least three spaced substantially parallel cord holding portions, namely at least two outer cord holding portions, and at least one intermediate cord holding portion, said outer cord holding portions and said pointer portion located in one plane, and said intermediate cord holding portion located in a parallel plane; and a driving cord extending mainly in said one plane engaging said outer cord holding portions, and having a deflected cord portion including a projecting center portion located in the other plane and engaging said intermediate cord holding portion so that said attaching means is held on said driving cord when said driving cord is tensioned.

3. In a device of the type described, in combination, a pointer consisting of a bent wire having a pointer portion and an attaching means including at least three spaced cord holding portions, namely at least two outer cord holding portions, and at least one intermediate cord holding portion, said outer cord holding portions and said pointer portion having notched surface portions located in one plane, and said intermediate cord holding portion having a notched surface portion located in a parallel plane, said three notched surface portions being located in a third plane extending normal to said parallel planes, said three cord holding portions being located between said parallel planes; and a driving cord extending mainly in said one plane engaging said notched surface portions of said outer cord holding portions, and having a deflected cord portion including a projecting center portion engaging said notched surface portion of said intermediate cord holding portion so that said attaching means is held on said driving cord when said driving cord is tensioned.

References Cited in the file of this patent

UNITED STATES PATENTS

| Number | Name | Date |
|---|---|---|
| 2,503,121 | Mills | Apr. 4, 1950 |
| 2,549,655 | Woodward | Apr. 17, 1951 |